(12) United States Patent
Hartrell et al.

(10) Patent No.: US 9,886,578 B2
(45) Date of Patent: *Feb. 6, 2018

(54) MALICIOUS CODE INFECTION CAUSE-AND-EFFECT ANALYSIS

(71) Applicant: Microsoft Technology Licensing, LLC, Redmond, WA (US)

(72) Inventors: Gregory D. Hartrell, Sammamish, WA (US); David J. Steeves, Seattle, WA (US); Efim Hudis, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,873

(22) Filed: Sep. 9, 2014

(65) Prior Publication Data

US 2015/0013007 A1 Jan. 8, 2015

Related U.S. Application Data

(63) Continuation of application No. 13/369,225, filed on Feb. 8, 2012, now Pat. No. 8,955,134, which is a continuation of application No. 11/321,754, filed on Dec. 28, 2005, now Pat. No. 8,117,659.

(51) Int. Cl.
| | |
|---|---|
| *H04L 9/00* | (2006.01) |
| *G06F 21/55* | (2013.01) |
| *H04L 29/06* | (2006.01) |
| *G06F 21/56* | (2013.01) |

(52) U.S. Cl.
CPC .......... *G06F 21/552* (2013.01); *G06F 21/565* (2013.01); *H04L 63/1416* (2013.01); *H04L 63/1425* (2013.01); *G06F 2221/034* (2013.01)

(58) Field of Classification Search
CPC .............................. H04L 63/145; H04L 63/14
See application file for complete search history.

(56) References Cited

U.S. PATENT DOCUMENTS

| | | | |
|---|---|---|---|
| 5,408,642 | A | 4/1995 | Mann |
| 7,093,239 | B1 | 8/2006 | van der Made |
| 7,133,845 | B1 | 11/2006 | Ginter et al. |

(Continued)

OTHER PUBLICATIONS

Non-Final Office Action Issued in U.S. Appl. No. 14/481,864, dated May 5, 2016, 15 Pages.

(Continued)

*Primary Examiner* — Josnel Jeudy
(74) *Attorney, Agent, or Firm* — Fountainhead Law Group P.C.

(57) ABSTRACT

A malware analysis system for automating cause and effect analysis of malware infections is provided. The malware analysis system monitors and records computer system activities. Upon being informed of a suspected malware infection, the malware analysis system creates a time-bounded snapshot of the monitored activities that were conducted within a time frame prior to the notification of the suspected malware infection. The malware analysis system may also create a time-bounded snapshot of the monitored activities that are conducted within a time frame subsequent to the notification of the suspected malware infection. The malware analysis system provides the created snapshot or snapshots for further analysis.

18 Claims, 8 Drawing Sheets

(56) References Cited

U.S. PATENT DOCUMENTS

| | | | |
|---|---|---|---|
| 7,624,443 B2 | 11/2009 | Kramer et al. | |
| 7,832,012 B2* | 11/2010 | Huddleston | 726/24 |
| 8,117,659 B2 | 2/2012 | Hartrell et al. | |
| 8,955,134 B2 | 2/2015 | Hartrell et al. | |
| 8,955,135 B2 | 2/2015 | Hartrell et al. | |
| 2003/0084323 A1 | 5/2003 | Gales | |
| 2004/0157624 A1* | 8/2004 | Hrastar | 455/456.1 |
| 2004/0243699 A1* | 12/2004 | Koclanes | H04L 29/06 709/224 |
| 2005/0055559 A1* | 3/2005 | Bucher | 713/188 |
| 2005/0076262 A1* | 4/2005 | Rowan et al. | 714/6 |
| 2006/0021054 A1 | 1/2006 | Costa et al. | |
| 2006/0031933 A1 | 2/2006 | Costa et al. | |
| 2006/0090205 A1* | 4/2006 | Ellis | 726/25 |
| 2006/0242705 A1 | 10/2006 | Sadhasivam et al. | |
| 2007/0100905 A1* | 5/2007 | Masters et al. | 707/201 |
| 2007/0150957 A1 | 6/2007 | Hartrell et al. | |
| 2012/0137342 A1 | 5/2012 | Hartrell et al. | |
| 2012/0144490 A1 | 6/2012 | Hartrell et al. | |
| 2015/0101010 A1 | 4/2015 | Hartrell et al. | |

OTHER PUBLICATIONS

"Final Office Action Issued in U.S. Appl. No. 14/481,864," dated Nov. 14, 2016, 6 Pages.

Gu, Guofei, et al., "BotHunter: Detecting Malware Infection Through IDS-Driven Dialog Correlation", In Proceedings of 16th USENIX Security Symposium on USENIX Security Symposium, vol. 7, Aug. 8, 2007, 16 Pages.

Non-Final Office Action Issued in U.S. Appl. No. 13/369,225, dated Jan. 3, 2014, 16 Pages.

Notice of Allowance Issued in U.S. Appl. No. 13/369,225, dated Jun. 19, 2014, 10 Pages.

Notice of Allowance Issued in U.S. Appl. No. 13/369,225, dated Aug. 28, 2014, 8 Pages.

Non-Final Office Action Issued in U.S. Appl. No. 13/369,243, dated Feb. 27, 2014, 17 Pages.

Notice of Allowance Issued in U.S. Appl. No. 13/369,243, dated Jun. 17, 2014, 10 Pages.

Non-Final Office Action Issued in U.S. Appl. No. 14/481,864, dated Apr. 23, 2015, 14 Pages.

Gu, Guofei et al., "BotHunter: Detecting Malware Infection Through IDS-Driven Dialog Correlation," Computer Science Laboratory STI International, 16th USENIX Security symposium, pp. 167-182.

Final Office Action Issued in U.S. Appl. No. 14/481,864, dated Aug. 18, 2015, 15 Pages.

* cited by examiner

FIG. 5

| Normalized Action | Pre-Notification Malware State | Post-Notification Malware State | State Transition |
|---|---|---|---|
| File Transfer (e.g., FTP) | Carrier | Persistence | External Communication |
| Instant Message | Activation | Persistence | External Communication |
| Remote Authentication | Activation | Persistence | Remote Control |
| Remote Control Access | Activation | Persistence | Remote Control |
| Network Facing Service Access | Propagation | Propagation | Remote Control |
| Outbound Network Connection | Carrier | Persistence | - - - |
| Web Site HTTP Get | Activation | Persistence | External Communication |
| Web File Transfer | Carrier | Execution | Install |
| Application Launched | Activation | Execution | Command & Control |
| File Copy from Media | Carrier | Execution | Install |
| File Created | Carrier | Execution | Install |
| Configuration Change | Activation | Execution | Command & Control |
| ... | ... | ... | ... |

| Time 604 | Recorded Activity 606 | Normalized Action 608 | Associated Malware State 610 |
|---|---|---|---|
| t0-2 | Inbound TCP connection to port 135 (RPC) | Network Service Access | Activation |
| t0-1 | Outbound UDP connection on port 69 (TFTP) | File Transfer | Carrier |
| t0 | File created (msblast.exe) | File Created | Execution |
| t0+1 | Register key modified (HKLM/...) | Configuration Change | Execution |
| t0+2 | Socket opened for listening on port 4444/TCP | New Socket Listing | Persistence |
| t0+3 | Outbound TCP connection to port 135 (RPC) | Outbound Network Connection | Propagation |
| t0+4 | Outbound TCP connection to port 135 (PPC) | Outbound Network Connection | Propagation |
| ... | ... | ... | ... |

*FIG. 6*

MALICIOUS CODE INFECTION CAUSE-AND-EFFECT ANALYSIS

CROSS REFERENCE TO RELATED APPLICATIONS

This application is a continuation application of U.S. application Ser. No. 13/369,225, filed Feb. 8, 2012, issued as U.S. Pat. No. 8,955,134, and entitled "MALICIOUS CODE INFECTION CAUSE-AND-EFFECT ANALYSIS," which is a continuation application of U.S. application Ser. No. 11/321,754, filed on Dec. 28, 2005, issued as U.S. Pat. No. 8,117,659, and entitled "MALICIOUS CODE INFECTION CAUSE-AND-EFFECT ANALYSIS," which are incorporated herein in their entirety by reference.

This application is related to U.S. Application Ser. No. 14/481,864, filed Sep. 9, 2014, and entitled "MALICIOUS CODE INFECTION CAUSE-AND-EFFECT ANALYSIS," and U.S. application Ser. No. 13/369,243, filed Feb. 8, 2012, issued as U.S. Pat. No. 8,955,135, and entitled "MALICIOUS CODE INFECTION CAUSE-AND-EFFECT ANALYSIS," which are incorporated herein in their entirety by reference.

BACKGROUND

As dependence on computer systems and computer networks increases along with the sophistication and the frequency of attacks on computer systems and computer networks, the subject of computer security is becoming ever more prominent in the industry. Computer security techniques are presently used to protect users of the computer systems and the application programs and operating systems from malicious software ("malware")—e.g., viruses, worms, and Trojans—designed specifically damage or disrupt a computer system, and other undesirable activity.

To guard against the risk of malware, protection technologies, such as anti-malware software are often employed. For example, anti-malware software programs can scan computer systems to detect malware embedded within infected computer files. Once detected, the malware can be removed from infected files, the infected files may be quarantined, or the infected file may be deleted from the computer system.

Anti-malware software is currently designed to use known patterns, or signatures, to detect and remove malware infections, including "spyware" from computer operating systems and networks. For example, the anti-malware software can look for these patterns in an operating system's data stores, in memory, or over a variety of network protocols. After the failure or successful removal of the malware, anti-malware software typically provides the protected computer system administrator or network operator information surrounding the "cleaning event," which is typically referred to as an event or alert. For example, upon successfully or unsuccessfully cleaning malware off a computer system, the anti-malware provides a single event that declares that the machine is now "clean" and in a known good state. The information can include a friendly virus name, a list of the actions taken, and a date/time reference, amongst other information recorded at the time. A difficulty with the information provided after an infection is detected by today's anti-malware software is that system administrators are unable to determine the root cause or origin of that malicious code. Another difficulty with the information provided by the anti-malware software is that the information does not allow the system administrators to assess the scope of the damage caused subsequent to the initial infection.

SUMMARY

A malware analysis system for automating cause and effect analysis of malware infections is provided. The malware analysis system monitors and records computer system activities. Upon being informed of a suspected malware infection, the malware analysis system creates a time-bounded snapshot of the monitored activities that were conducted within a time frame prior to the notification of the suspected malware infection. The malware analysis system may also create a time-bounded snapshot of the monitored activities that are conducted within a time frame subsequent to the notification of the suspected malware infection. The malware analysis system provides the created snapshot or snapshots for further analysis. For example, the snapshots of the monitored activities may be analyzed to determine the cause and effect of the malware infection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates a table of example mappings of normalized actions to pre- and post-notification malware states.

FIG. 6 illustrates a table of example mappings of recorded activities to normalized actions and associated malware states.

DETAILED DESCRIPTION

Figure 1:
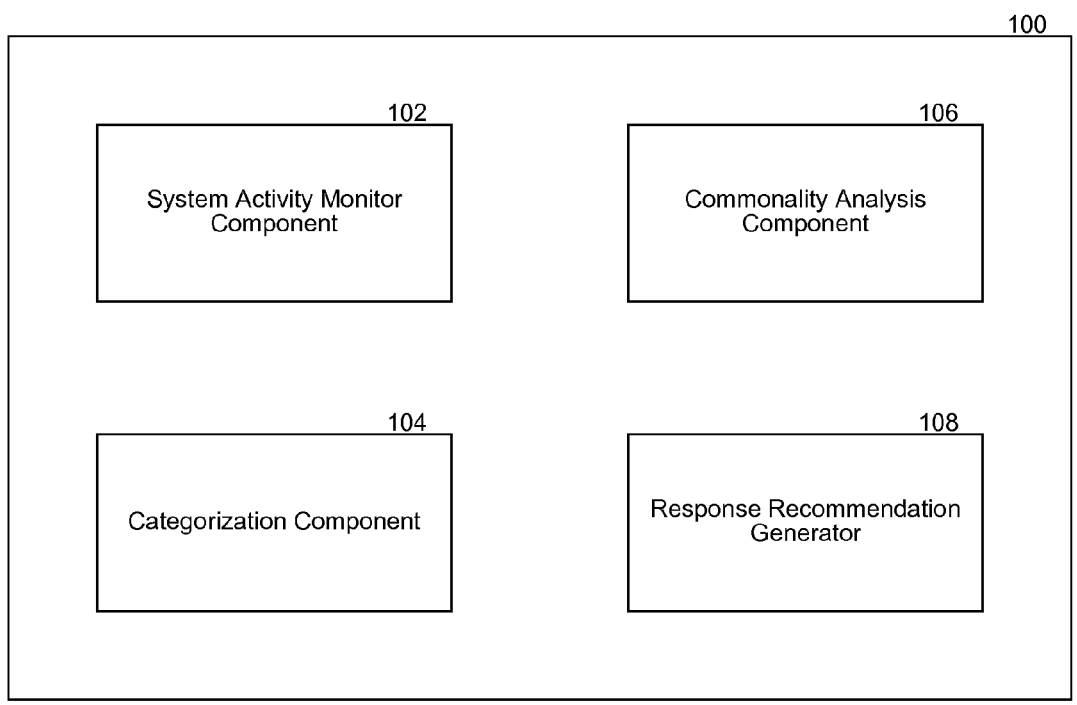
FIG. 1 is a high-level block diagram that illustrates selected components of a malware analysis system, according to some embodiments.

A method and system for automating cause and effect analysis of malware infections, is provided. In some embodiments, the malware analysis system executes on a computer system or device, such as a desktop computer system, a server, firewall, proxy, domain controller, router, etc., and monitors for common operating system and network activities that lead to the creation, persistence and proliferation of malware. Upon being informed of the detection of a malware infection or suspected infection, for example, by locally executing anti-malware software, the malware analysis system provides a snapshot (or evidence) of the activities that were conducted within a specified time frame before the detected or suspected infection for analysis.

For example, the malware analysis system can provide a snapshot of the last ten minutes of the monitored activities (e.g., local system activity, network activity, etc.) prior to the detection of the infection. This snapshot may be referred to as a "pre-infection snapshot." In some embodiments, the malware analysis system can provide the snapshot of the activities to a remote (e.g., centralized) data store. The snapshot of the activities can then be analyzed to determine the "root cause" or source of the infection (i.e., the activities that led to the infection), including, for example, how the infected computer system was discovered, how the infected computer system was accessed, what operating system objects were manipulated, and the like. In effect, the malware analysis system creates a "crash dump" for malware infections that can be analyzed to determine, for example, the root cause of the infection.

In some embodiments, the malware analysis system can provide a snapshot of the activities that were conducted within a specified time frame after the detected or suspected infection for analysis. This snapshot may be referred to as a "post-infection snapshot." For example, the malware analysis system can provide a snapshot of the monitored activities (e.g., local system activity, network activity, etc.) for the subsequent ten minutes after the detection of the infection. The snapshot of the activities can then be analyzed to assess the damage and/or characterize any additional threats or damage to the infected computer system. For example, the snapshot of the subsequent activities can be analyzed to determine the activities that occurred subsequent to the infection, including identifying the operating system objects that were manipulated, additional communications that occurred with other computer systems, and the like. When applied across multiple computer systems and/or networks, a knowledgeable administrator, such as a security or system administrator, can analyze the snapshots (i.e., the snapshot of the activities prior to the detected/suspected infection and/or the snapshot of the activities subsequent to the detected/suspected infection) and use the result of the analysis to manually or automatically re-configure security policies in the environment to prevent future infections.

In some embodiments, the malware analysis system may monitor additional activities subsequent to the detection of an infection or suspected infection. For example, the malware analysis system may be configured to monitor a specific directory or directories in the file system when there are no infections or suspected infections on the computer system, and configured to monitor the entire file system when informed of an infection or suspected infection.

In some embodiments, the malware analysis system may apply a state model for malware to normalize and categorize the monitored activities in the pre-infection snapshot and/or the post-infection snapshot to aid in constructing cause and effect relationships. The state model may describe the phases of a malware infection within and about the computer system, such as propagation, activation, carrier, execution and persistence, and allows many seemingly normal system activities to be identified as part of a malicious code's lifespan when categorized in the context of a suspected infection. Applying the state model also allows for categorizing the stage in which the malware was in, and aids in determining the extent of an infection.

In some embodiments, the malware analysis system may perform commonality analysis on the normalized activities in the pre-infection snapshot and/or the post-infection snapshot to find any recurring activities. Once the malware analysis system discovers what the commonality is between the snapshots, the malware analysis system can tailor and provide a recommendation for responding to the detected infection. The malware analysis system can utilize an expert system to tailor and provide a recommendation based on the commonality analysis. For example, the commonality analysis process may indicate that each of four infected machines visited the same web site prior to being infected. Here, the malware analysis system may determine that this web site most likely served the malware to each of the infected machines. Using the expert system, the malware analysis system may recommend that this web site be "blocked."

FIG. 1 is a high-level block diagram that illustrates selected components of a malware analysis system 100, according to some embodiments. The malware analysis system comprises a system activity monitor component 102, a categorization component 104, a commonality analysis component 106, and a response recommendation generator 108. The system activity monitor component provides runtime monitoring of the operating system resources for changes to the file system, common file formats, configurations (registry), network activities, use of common application program interfaces (APIs), or any other operating system object. The system activity monitor component may run on and monitor the activity of a computer system, such as, by way of example, a local desktop operating system, a server or network device. While executing, the system activity monitor component records the monitored activities in a data store, which may be in memory, on physical media, or other logical data store. The system activity monitor component may be configured to record information regarding the monitored activity, such as, by way of example: the identified operating system object or network object involved in the monitored activity (e.g., file name, socket, IP address, logical paths, etc.); the details of the change (e.g., create file, listen on network socket, etc.); if applicable, the details of the object prior to the change; the source(s) of the change (e.g., process id, user security context, logical storage identity from which data originated, logical storage identity where the change occurred, network sources such as uniform resource locator (URL) or internet protocol (IP) address, the API call used to make the change, etc.); a date and time stamp in which the event occurred. The system activity monitor component can be notified of a malware infection. For example, the system activity monitor component may provide an API through which an anti-malware system, or other well-known intrusion detection systems, can pass a notification of a confirmed or suspected malware infection. Upon receiving the notification, the system activity monitor component creates and provides a time-bounded snapshot of activities that occurred before and/or after the notification of infection to the other components of the malware analysis system. For example, the system activity monitor component may provide the snapshot of activities to a centralized data store that is accessible by the other components of the malware analysis system.

The categorization component processes the snapshot of the activities that are provided by the system activity monitor component. In some embodiments, the categorization component normalizes the snapshot data for use by the commonality analysis component. Normalization of the snapshot data may involve labeling and associating individual activities that are contained in the snapshots with predetermined, common categories of system activities. Common categories of system activities may include, for example, file transfer, web file transfer, instant messaging, remote authentication, remote control access, outbound network connection, application launch, file copy from media, file created, configuration change, etc. In some embodiments, the categorization component may map the normalized activities along a malware state model, with the initial infection notification as the reference for pre- and post-infection activities. The malware state model may comprise a multiple number of different malware states, and the categorization component may intelligently map each normalized activity in the snapshot to a malware state. Mapping the normalized activities to the malware states aids in determining the sequence of events that make up the infection. The mapping of the normalized activities and the malware states may be tuned (i.e., configured) by, for example, an administrator. The categorization component may provide the normalized snapshot data and/or the mapping of the normalized activities to the malware states to the other components of the malware analysis system.

The commonality analysis component compares the normalized snapshots and differentiates the normalized snapshots that are related to the same malware infection. In some embodiments, upon every comparison, the commonality analysis component, upon performing a comparison of the normalized snapshots, labels or tags the like-activities (i.e., duplicates) as "suspicious" with a given or specified malware state, and the unlike activities or events as "potentially normal." The activities that are tagged as potentially normal can be later filtered. After numerous comparisons, only certain reoccurring activities are likely to remain, each categorized as either potentially normal or suspicious with a malware state. The commonality analysis component may make the results of the categorization available to administrators. For example, an administrator can then use this information to mark reoccurring activities as malicious (i.e., part of the infection). The commonality analysis component may also provide the results of its processing to the other components of the malware analysis system. In some embodiments, the commonality analysis component may call out to (i.e., obtain information from) other event sources, such as, by way of example, servers, firewalls, proxies, etc., to conduct further categorization and commonality analysis.

The response recommendation generator processes the information provided by the commonality analysis component and generates a recommendation for responding to the malware infection. The response recommendation generator may generate the recommendations or guidance based on the activities (e.g., the normalized activities) that are determined to be part of the detected malware infection. In some embodiments, the response recommendation generator may use an expert system that comprises a plurality of rules that are applied to determine a recommendation or multiple recommendations based on the results of the categorization provided by the commonality analysis component. The recommendations can be associated with specific types of system activities. For example, a recommendation may be to stop file transfers by implementing packet filtering or changes in system policy. The response recommendation generator may make the recommendations available to system or security administrators.

In a typical deployment of the malware analysis system, the various components of the malware analysis system are deployed over a multiple number of computer systems and devices. For example, the system activity monitor component may execute on all of the computer systems that are to be monitored, and one or more of the categorization component, the commonality analysis component, and the response recommendation generator may execute on one of the aforementioned computer systems or another, different computer system. One skilled in the art will appreciate that the malware analysis system may be deployed in other ways. For example, a remotely executing system activity monitor may remotely monitor the activities on certain types of computer systems, such as network devices. Moreover, one or more of the categorization component, the commonality analysis component, and the response recommendation generator may not be contained in the malware analysis system.

The computing device on which the malware analysis system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, network devices, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
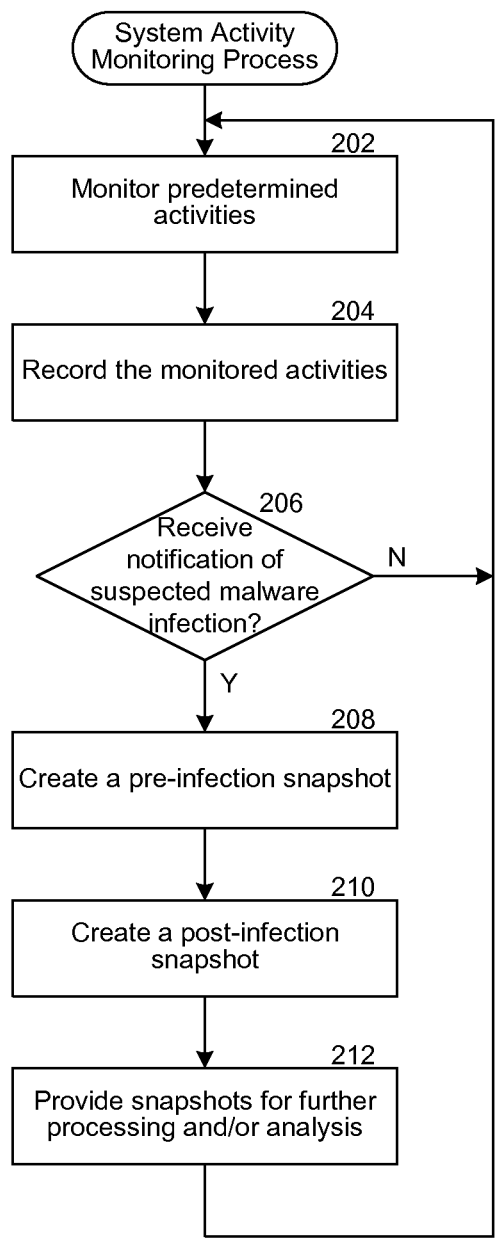
FIG. 2 is a flow diagram that illustrates the processing of the system activity monitor component of the malware analysis system, according to some embodiments.

FIG. 2 is a flow diagram that illustrates the processing of the system activity monitor component of the malware analysis system, according to some embodiments. By way of example, the system activity monitor component may execute as a runtime process that may use any of a variety of well-known monitoring techniques to monitor operating system and/or network activities. In block 202, the system activity monitor component monitors predetermined activities on or about the computer system. For example, the predetermined activities to monitor may be specified by an administrator in a policy that contains settings for the system activity monitor component. In block 204, the system activity monitor component records the monitored activities. In one embodiment, the system activity monitor component may record the activities in a sequential or circular data store in memory, on physical media, or other logical data store. In block 206, the system activity monitor component determines whether it received notification of a suspected malware infection. If no notification is received, the system activity monitor component returns to block 202 and continues to monitor the predetermined activities. If a notification of a suspected malware infection is received, then, in block 208, the system activity monitor component creates a pre-infection snapshot of the monitored activities. For example, the system activity monitor component may create a snapshot of the previous X seconds of the monitored activities that were recorded prior to receiving the notification event. The amount of monitored activities to include in the snapshot (e.g., the X seconds) may be specified by an administrator in the policy associated with the system activity monitor component. In block 210, the system activity monitor component creates a post-infection snapshot of the monitored activities. For example, the system activity monitor component may create an additional snapshot of the subsequent Y seconds of recorded monitored activities after receiving the notification event. In some embodiments, the activities that are monitored subsequent to receiving the notification event may be different from the activities that are monitored prior to receiving the notification event. In block 212, the system activity monitor component provides the created snapshots for further processing and/or analysis. For example, the system activity monitor component may provide the snapshots to a remote data store that is accessible by the other components of the malware analysis system and/or an administrator. The other components of the malware analysis system can process the pre-infection snapshot and the post-infection snapshot together when both are ready, or process each snapshot immediately and independent of each other.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 3:
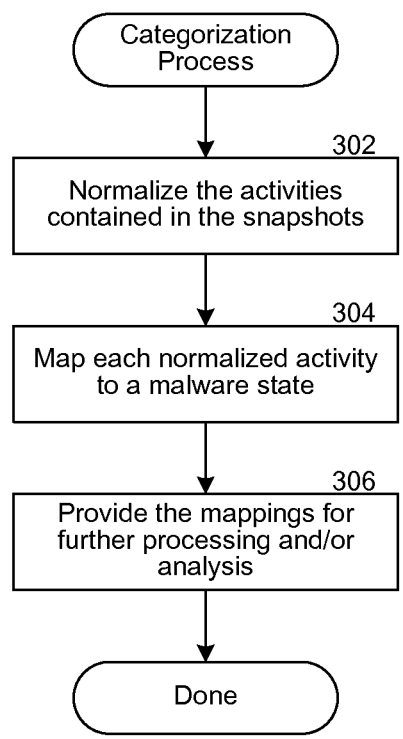
FIG. 3 is a flow diagram that illustrates the processing of the categorization component of the malware analysis system, according to some embodiments.
Figure 4:
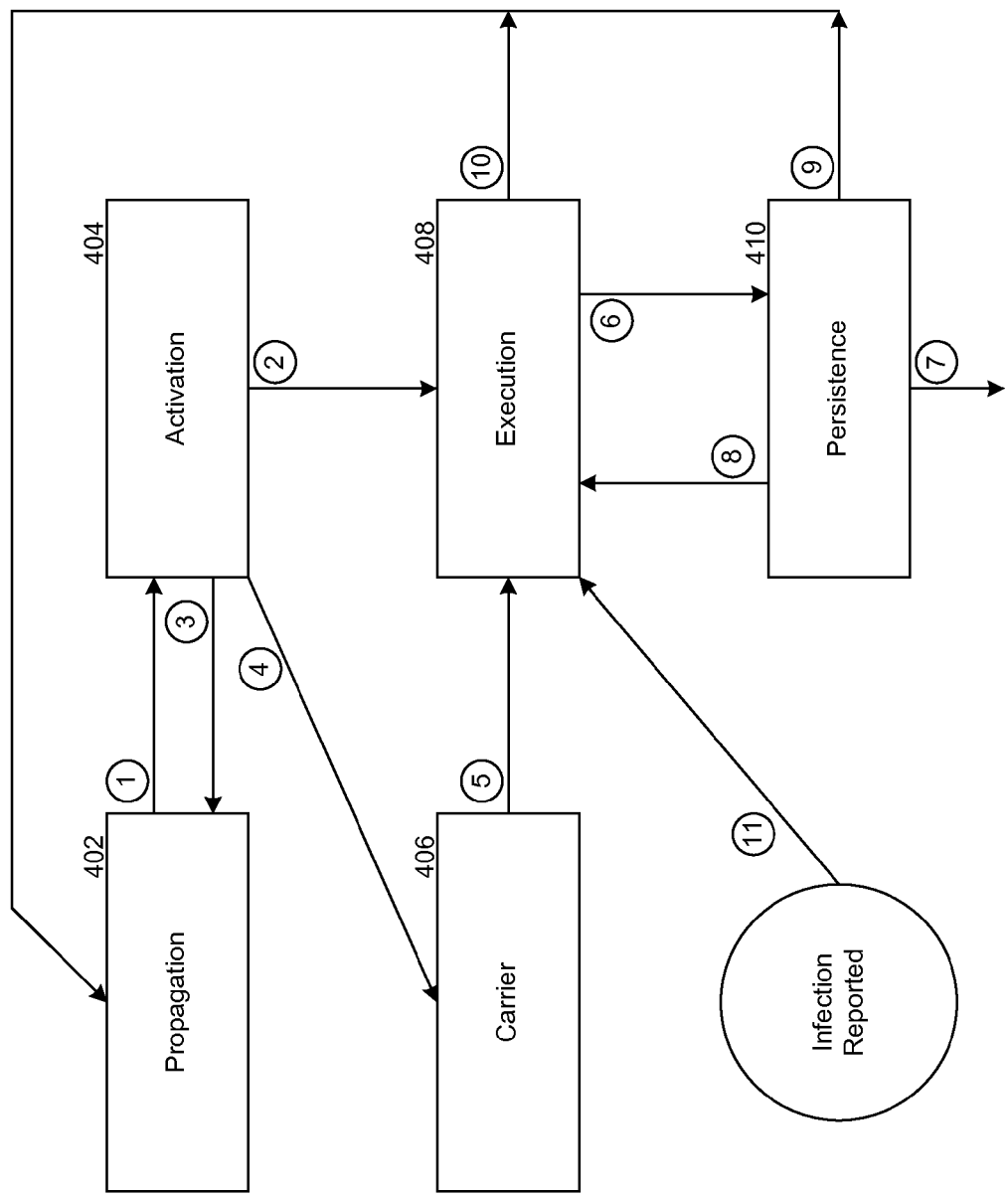
FIG. 4 is a block diagram that illustrates an example malware state model, according to some embodiments.

FIG. 3 is a flow diagram that illustrates the processing of the categorization component of the malware analysis system, according to some embodiments. In block 302, the categorization component normalizes the activities contained in the snapshots provided by the system activity monitor component into predetermined set of common categories of system or network events (also referred to as "normalized actions"). In block 304, the categorization component maps each normalized activity to a malware state as provided by a malware state model. FIG. 4 is a block diagram that illustrates an example malware state model, according to some embodiments. The malware state model describes how malware typically behaves in a computer system, and may be specified by an administrator. One skilled in the art will appreciate that the malware state model may be comprised of different states (e.g., the states in the model may change, be removed, or other states may be added) than the states that are depicted.

As depicted in FIG. 4, the malware states comprise a propagation state 402, an activation state 404, a carrier state 406, an execution state 408, and a persistence state 410. The malware infection targets are generated in the propagation state. For example, a computer system needs to be targeted in order for it to be infected by the malware. This may occur, for example, when a user uses the computer system to visit a source of the malware, such as a web site. Once the malware successfully propagates onto the computer system (i.e., finds a target) (stage 1), it is considered to be in the activation state. When the malware on the computer system successfully executes its payload (stage 2), the malware is considered to proceed from the activation state to the execution state. Otherwise, if the activation failed on the computer system (stage 3), the malware is considered to move back to the propagation state. Sometimes, some other carrier or secondary channel is used to bring the additional code, instructions, data, etc. that are needed by the malware, for example, to execute on the computer system stage 4). For example, the user of the computer system may be tricked into clicking on another web site link, which causes the downloading of the additional code, instructions or data. In another example, the malware, such as a worm, could pull from a remote data source additional code, instructions or data after the malware has been activated on the computer system. In these instances, the malware on the computer system is considered to be in the carrier state. Then, when the malware on the computer system successfully executes its payload (stage 5), the malware is considered to proceed from the carrier state to the execution state. When the malware successfully installs itself on the computer system (stage 6), the malware is considered to proceed from the execution state to the persistence state. In the persistence state, the malware may communicate with external sources (referred to as external communication) (stage 7). For example, hackers can use the external communication (e.g., instant messaging channels, etc.) to send commands to the computer system to remotely control the compromised computer system. When the hackers, or some other controlling entity, remotely commands and controls the computer system (stage 8), the malware is considered to proceed back to the execution state. When the malware gains durability on the computer system by, for example, persisting runtime activities, surviving operating system changes, etc. (stage 9) the malware is considered to proceed from the execution state to the propagation state. If the malware does not persist itself on the computer system (stage 10), the malware is considered to proceed from the execution state to the propagation state. Malware in the propagation state can propagate itself within the same computer system or to another computer system (i.e., another target). When an infection is reported, for example, by the anti-malware software (stage 11), the malware is considered to be in the execution state. The system activity monitor component can use the report of the infection as the base time (e.g., t0) from which to create the time-bounded snapshots of recorded activities. Thus, t0 can denote the time the malware executed on the computer system. In other embodiments, the malware may be considered to be in a state other than the execution state when an infection is reported. For example, a network module may detect a port scan, and indicate the initial state to be propagation.

FIG. 5 illustrates a table 500 of example mappings of normalized actions to pre- and post-notification malware states. The categorization component can use the table of mappings of normalized actions to intelligently map each normalized activity to a malware state. The table of example mappings of normalized actions comprises one or more mapping records 502, and each mapping record is shown comprising, by way of example, four fields including a normalized action field 504, a pre-notification malware state field 506, a post-notification malware state field 508, and a state transition field 510. The normalized action field identifies a common category of system or network event. The activities that are recorded and contained in the pre-infection and post-infection snapshots are mormalized into one of these common categories. The pre-notification malware state field specifies a malware state to assign to the common category of system or network event that is identified in the corresponding normalized action field if the identified common category of system or network event occurred prior to the notification of the malware infection. Stated differently, if the normalized action is contained in the pre-infection snapshot, the normalized action is assigned the malware state that is specified in the corresponding pre-notification malware state field. The post-notification malware state field specifies a malware state to assign to the common category of system or network event that is identified in the corresponding normalized action field if the identified common category of system or network event occurred subsequent to the notification of the malware infection. Stated differently, if the normalized action is contained in the post-infection snapshot, the normalized action is assigned the malware state that is specified in the corresponding post-notification malware state field. The state transition field specifies or denotes the normalized activity that is recognized as a result of moving from one state to another state. The state transition may be considered a transition condition, and is recorded to aid comparative analysis. The mappings of the normalized actions to corresponding pre- and post-notification malware states are configurable. For example, an administrator can tune the mappings based on past performance/accuracy.

FIG. 6 illustrates a table 600 of example mappings of recorded activities to normalized actions and associated malware states. The table of example mappings of recorded activities comprises one or more mapping records 602, and each mapping record is shown comprising, by way of example, four fields including a time field 604, a recorded activity field 606, a normalized action field 608, and an associated malware state field 610. The time field specifies, relative to "t0" (i.e., the time at which the notification of the malware infection is received by the malware analysis system), the time the activity identified in the corresponding recorded activity field was recorded by the system activity monitor component of the malware analysis system. The normalized action field identifies a normalized action that maps to the activity that is identified in the corresponding recorded activity field. The associated malware state field identifies the malware state that is assigned to the normalized action that is identified in the corresponding normalized action field, based on the time the activity that corresponds to the normalized action was recorded.

By way of example, the record for the time "t0−1" indicates that the recorded activity is "Outbound UDP connection on port 69 (TFTP)." The categorization component may have normalized this recorded activity to be "File Transfer" as indicated in the normalized action field. Using the table of example mappings of normalized actions (FIG. 5), the categorization component assigns this normalized action to the "Carrier" malware state since this normalized action occurred prior to the notification of the malware infection. Assuming that this normalized action occurred subsequent to the notification of the malware infection, the categorization component would assign this normalized action to the "persistence" malware state. In a similar manner, the categorization component can use (1) a predetermined mapping of recorded activities to corresponding normalized actions, and (2) a predetermined mapping of the normalized actions to corresponding pre-notification malware states and post-notification malware states (e.g., the example table illustrated in FIG. 5) to normalized each recorded activity contained in the snapshots and assign to each normalized activity (i.e., normalized action) an appropriate malware state based on the time the activity was recorded.

Referring again to FIG. 3, in block 306, the categorization component provides the mapped normalized activities for further processing and/or analysis.

Figure 7:
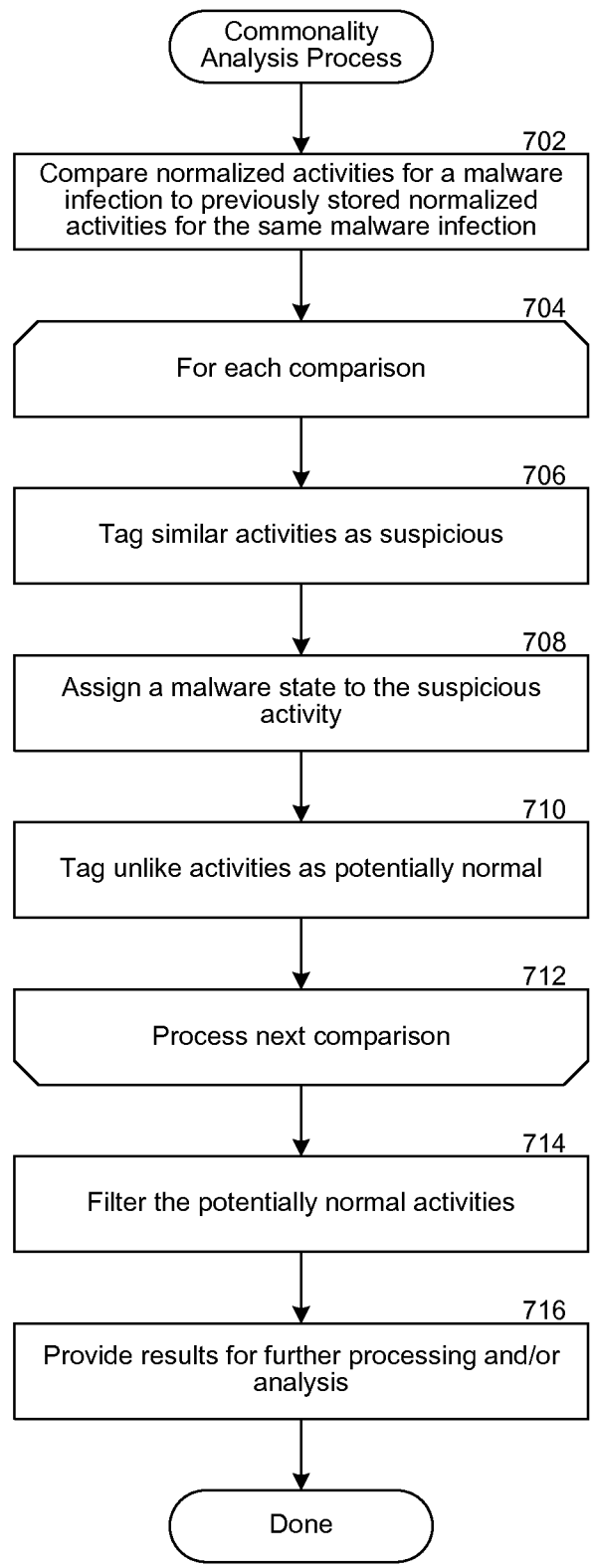
FIG. 7 is a flow diagram that illustrates the processing of the commonality analysis component of the malware analysis system, according to some embodiments.

FIG. 7 is a flow diagram that illustrates the processing of the commonality analysis component of the malware analysis system, according to some embodiments. In block 702, the commonality analysis component compares the normalized activities that are recorded for a particular malware infection to previously stored normalized activities for the same malware infection. For example, the previously stored normalized activities may be the normalized activities which were obtained from a snapshot provided by a different computer system that was similarly infected. For each comparison (block 704), the commonality analysis component performs blocks 706 to 710, until all the comparisons are performed (block 712). In block 706, the commonality analysis component tags similar activities as being suspicious. In block 708, the commonality analysis component assigns a malware state to the suspicious activity. For example, the commonality analysis component may determine an appropriate malware state from the table of example mappings of normalized actions to pre- and post-notification malware states (FIG. 5). In block 708, the commonality analysis component tags unlike (i.e., dissimilar) activities as being potentially normal. For example, these potentially normal activities are the activities that were recorded in only one or a few of the similarly infected computer systems, and are likely not associated with the malware infection. Subsequent to performing all the comparisons of the normalized activities that were recorded and provided in the pre-infection and/or post-infection snapshots from the infected computer systems for the particular malware infection (blocks 704 to 712), the commonality analysis component, in block 714, filters out the potentially normal activities (i.e., the normalized activities which were tagged as being potentially normal). In block 716, the commonality analysis component provides the results for further processing and/or analysis. For example, the results include the normalized activities which were tagged as being suspicious, but do not include the normalized activities which were tagged as being potentially normal and, thus, filtered by the commonality analysis component. One skilled in the art will appreciate that the commonality analysis component may use any of a variety of well-known comparative analysis techniques to identify statistically significant commonalities.

Figure 8:
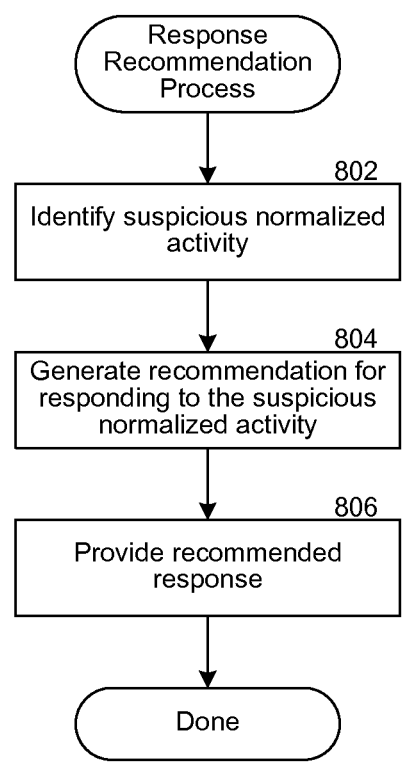
FIG. 8 is a flow diagram that illustrates the processing of the response recommendation generator of the malware analysis system, according to some embodiments.

FIG. 8 is a flow diagram that illustrates the processing of the response recommendation generator of the malware analysis system, according to some embodiments. In block 802, the response recommendation generator identifies a suspicious normalized activity. This may be a normalized activity that was tagged as being suspicious by the commonality analysis component. In block 804, the response recommendation generator generates a recommendation or multiple recommendations for responding to the suspicious normalized activity. In some embodiments, the response recommendation generator can utilize an expert system to generate the appropriate recommended response. In block 806, the response recommendation generator provides the recommended response. For example, the response recommendation generator can provide the recommended response to an administrator.

Example Scenarios

In a first example, ten computer system users visit a web site using their personal computers. Each of the computer systems are running anti-malware software and the malware analysis system, which is monitoring all activities that modify local data stores (e.g., file system, registry, databases, etc.) and network activities (e.g., TCP/IP connections, web site visits, etc.). Each of the ten computer systems become infected with a known spyware application, served by the web site, which has mild variations from previously known versions to evade or complicate removal by anti-malware software. Upon detecting the variant (i.e., the spyware application), locally installed anti-malware software on each computer system attempts to clean the infection, and creates an "event" describing the actions it took and an indication of what succeeded or failed. The malware analysis system running on each of the computer systems receives an indication of the detection of the variant, and provides a snapshot of the last five minutes and subsequent five minutes of local system and network activity to a centralized data store. The malware analysis system then normalizes the snapshot data on the centralized data store, and conducts commonality analysis on the ten provided snapshots to find any recurring activities. The malware analysis system performs the commonality analysis and discovers that each of these ten computer systems visited the same web site within one minute prior to the infection. The malware analysis system may alert the system operator of all ten infected computer systems to the pattern, and provide a recommendation to block this web site at their organization's egress points to prevent future infections.

In another example, ten computer system users visit a web site using their personal computers. Each of the computer systems are running anti-malware software and the malware analysis system, which is monitoring all activities that modify local data stores (e.g., file system, registry, databases, etc.) and network activities (e.g., TCP/IP connections, web site visits, etc.). Each of the ten computer systems become infected with a known spyware application, served by the web site, which has mild variations from previously known versions to evade or complicate removal by anti-malware software. Upon detecting the variant (i.e., the spyware application), locally installed anti-malware software on each computer system attempts to clean the infection, and creates an "event" describing the actions it took and an indication of what succeeded or failed. The malware analysis system running on each of the computer systems receives an indication of the detection of the variant, and provides a snapshot of the last five minutes and subsequent five minutes of local system and network activity to a centralized data store. The malware analysis system then normalizes the snapshot data on the centralized data store, and conducts commonality analysis on the ten provided snapshots to find any recurring activities. The malware analysis system performs the commonality analysis and discovers that each of these ten computer systems visited the same web site within one minute prior to the infection. The malware analysis system may request additional information regarding monitored activities during the same time period from other security event sources, such as, by way of example, egress firewalls, and receive the additional snapshots from each of these sources. The malware analysis system can then perform further commonality analysis on the newly provided snapshots. For example, the malware analysis system may discover additional computer systems that have visited the same web site, as well as several other computer systems that have been contacted by the web site in return. These new computer systems may or may not be running anti-malware software or the malware analysis system. The malware analysis system may alert the system operator of all ten infected computer systems to the pattern, and provide a recommendation to block this web site at their organization's egress points to prevent future infections. In addition, malware analysis system may alert the system operator of the several other system systems that may be infected with the spyware or other malware, since these other computer systems also visited or were contacted by the known "bad" web site.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable memory storing computer-executable instructions for controlling a computing device to analyze a malware infection, the computer-executable instructions comprising instructions that:
   receive a pre-infection snapshot from each of a plurality of machines suspected of being infected with malware, the pre-infection snapshots identifying monitored activities that were conducted at machines suspected of being infected with malware prior to the machine being suspected of being infected with malware;
   compare the monitored activities of the pre-infection snapshots of each of the plurality of machines to the monitored activities of the pre-infection snapshots of other machines to identify monitored activities that are common across multiple machines; and
   automatically re-configure security policies of the plurality of machines based on analysis of the monitored activities that are common to prevent a future infection caused by malware.

2. The computer-readable memory of claim 1 wherein the computer-executable instructions further comprise instructions that normalize the monitored activities.

3. The computer-readable memory of claim 2 wherein the instructions that normalize further associate categories with the monitored activities.

4. The computer-readable memory of claim 3 wherein a first monitored activity of a first machine and a second monitored activity of a second machine are common when associated with the same category.

5. The computer-readable memory of claim 2 wherein the computer-executable instructions further comprise instructions that map the normalized activities to a malware state of a malware state model.

6. The computer-readable memory of claim 1 wherein the computer-executable instructions further comprise instructions that:
   receive post-infection snapshots from a plurality of machines suspected of being infected with malware, each of the post-infection snapshots identifying monitored activities that were conducted at each machine suspected of being infected with malware subsequent to the machine being suspected of being infected with malware, and
   compare the monitored activities of the post-infection snapshots to identify monitored activities that are common across multiple pre-infection snapshots.

7. The computer-readable memory of claim 6 wherein the computer-executable instructions further comprise instructions that tag, as a candidate for being caused by the infection, the monitored activities that are common across multiple post-infection snapshots.

8. A method performed by a computing device to analyze a malware infection, the method comprising:
   receiving a snapshot of each of a plurality of machines suspected of being infected with malware, each snapshot identifying monitored activities of a machine suspected of being infected with malware during a time frame associated with the machines being suspected of being infected with malware;
   comparing the monitored activities of the snapshots of one or more of the plurality of machines to the monitored activities of the snapshots of other machines to identify monitored activities that are common to multiple machines and that are candidates for being related to a cause of the malware infection;

indicating that the monitored activities that are common as a possible cause of the malware infection; and providing a recommendation for responding to the malware infection.

9. The method of claim 8 wherein the snapshots are pre-infection snapshots.

10. The method of claim 8 including prior to comparing the monitored activities, normalizing the monitored activities.

11. The method of claim 10 wherein the normalizing includes associating categories with the monitored activities.

12. The method of claim 8 including automatically reconfiguring security policies to prevent future malware infections.

13. A computing device for analyzing a malware infection comprising:

a data store storing pre-infection snapshots of a plurality of machines suspected of being infected with malware, the pre-infection snapshots identifying monitored activities that were performed at machines suspected of being infected with malware prior to the machines being suspected of being infected with malware, a memory storing computer-executable instructions that:

indicate monitored activities of the pre-infection snapshots that are common to the machines and that are candidates for being related to the cause of the infection by comparing the monitored activities of the pre-infection snapshots of machines to the monitored activities of the pre-infection snapshots of other machines; and provide an alert and a recommendation for responding to the malware infection based on the identified monitored activities so that security policies can be changed to prevent a future malware infection; and a processor that executes the computer-executable instructions stored in the memory.

14. The computing device of claim 13 wherein the memory stores computer-executable instructions that normalize the monitored activities.

15. The computing device of claim 14 wherein the instructions that normalize associate categories with the monitored activities.

16. The computing device of claim 15 wherein a first normalized activity of a first machine and a second normalized activity of a second machine are common when associated with the same category.

17. The computing device of claim 13 wherein the memory stores computer-executable instructions of an expert system that generates the recommendation.

18. The computing device of claim 15 wherein the categories includes file transfer, web file transfer, instant messaging, remote authentication, remote control access, outbound network connection, application launch, file copy from media, file created, and configuration change.

* * * * *